INVENTOR.

HELMUT MAYR
RICHARD PELTE
THEODOR HUBER

United States Patent Office 3,561,855
Patented Feb. 9, 1971

3,561,855
CINEMATOGRAPHIC APPARATUS WITH BUILT-IN EXPOSURE METER
Helmut Mayr, Richard Pelte, and Theodor Huber, Munich, Germany, assignors to Agfa-Gevaert Aktiengesellschaft, Leverkusen, Germany
Filed Sept. 19, 1968, Ser. No. 760,791
Claims priority, application Germany, Sept. 29, 1967, A 56,935
Int. Cl. G03b 19/18, 9/10
U.S. Cl. 352—141               10 Claims

ABSTRACT OF THE DISCLOSURE

The shutter (8) of a motion picture camera has a flat light reflecting and diffusing front surface (8a) which directs diffused scene light against one or both parallel-connected photoelectric resistors (11, 12) in the circuit of an exposure meter (5, 11, 12, 14) which is built into the camera and serves to adjust the diaphragm (6). The front surface is provided with a flat plate-like liner (10) of transparent lightweight synthetic plastic material. When the shutter admits scene light to an unexposed film frame (7), its front surface is moved away from the path (A–B–C) of incoming scene light. When the shutter is at a standstill, its front surface directs light against a single photoelectric resistor (11).

BACKGROUND OF THE INVENTIIN

The present invention relates to cinematographic apparatus in general, and more particularly to improvements in motion picture cameras with built-in exposure meters. Still more particularly, the invention relates to improvements in motion picture cameras of the type wherein the shutter reflects a certain amount of scene light against a photoelectric receiver in the circuit of the exposure meter. An advantage of such constructions is that the camera need not be provided with light deflecting means which is permanently in the path of light travelling toward the film, i.e., that the photoelectric receiver receives scene light only during the intervals between successive exposures.

In certain presently known motion picture cameras, the shutter carries a conical member which has a mirror-like finish and reflects light against a photoelectric receiver in the exposure meter circuit so that the latter can adjust the diaphragm as a function of scene brightness. The light-reflecting member is expensive and occupies a relatively large amount of space in the housing of a motion picture camera.

It is also known to mount the photoelectric receiver of the exposure meter on the rotary shutter of a motion picture camera. A drawback of such proposal is that the electrical connection between the travelling receiver and the remainder of the circuit must be established by way of sliding contacts which are subject to corrosion.

SUMMARY OF THE INVENTION

One of the objects of our invention is to provide a cinematographic apparatus, particularly a motion picture camera having a built-in exposure meter which adjusts the diaphragm, wherein the photosensitive element or elements of the exposure meter circuit receive scene light in a novel and improved way.

Another object of the invention is to provide a compact, lightweight and inexpensive shutter for use in a camera of the just outlined character.

An additional object of the invention is to provide the shutter with novel light reflecting and diffusing means.

A further object of the invention is to provide a camera wherein the part which directs scenelight to the photosensitive means of the exposure meter cannot reduce the amount of that light which is intended to reach the unexposed film frame in the course of an exposure.

The invention is embodied in a cinematographic apparatus, particularly in a motion picture camera with built-in exposure meter which adjusts the diaphragm. The camera comprises objective means arranged to admit scene light along a predetermined path, shutter means located behind the objective means and rotatable about a predetermined axis which is preferably parallel to the optical axis of the objective means, the shutter means having a front surface which respectively extends across and is moved away from the path of incoming scene light in a first and a second range of angular positions of the shutter means, a transparent liner covering at least a portion of the front surface, and exposure meter means including photosensitive receiver means fixedly mounted adjacent to the liner and located outside of the aforementioned path. The liner is preferably a flat plate of lightweight synthetic plastic material, and the front surface of the shutter means is preferably a light reflecting and light diffusing surface which can reflect at least 50 percent of incident light, preferably between 60 and 80 percent of such light.

The photosensitive receiver means preferably comprises a plurality of photoelectric resistors, most preferably two resistors which are connected in parallel and are disposed mirror symmetrically with reference to the axis of the shutter means. The arrangement is preferably such that the shutter means is rotatable from a starting position in which the transparent liner on its front surface overlaps only one of the two discrete resistors.

The novel features which are considered as characteristic of the invention are set forth in particular in the appended claims. The improved cinematographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENT

Figure 1:
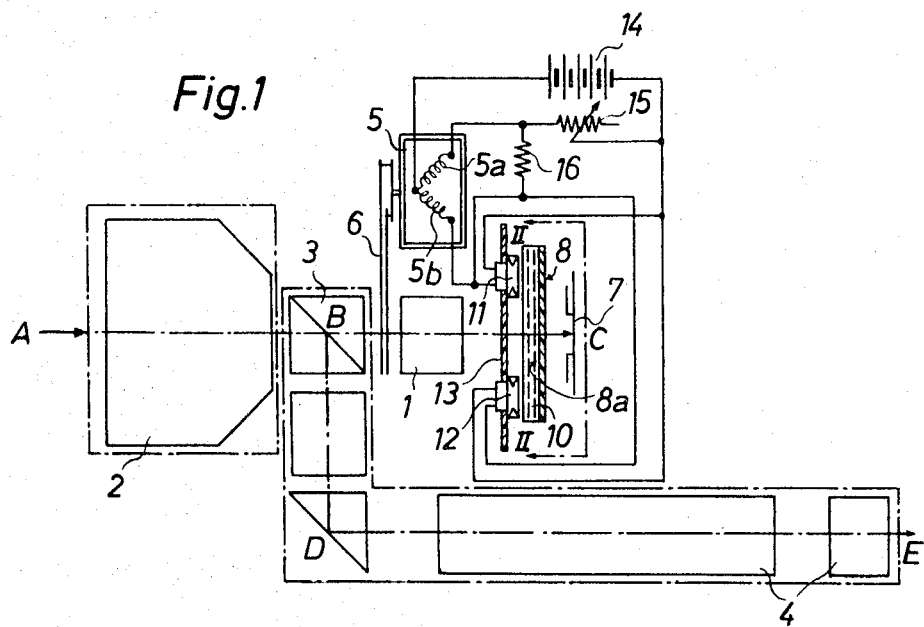
FIG. 1 is a schematic partially plan and partially sectional view of a motion picture camera which embodies one form of our invention.

The motion picture camera of FIG. 1 comprises an objective system including a base objective 1 and a second objective 2 of variable focal length. The path of scene light which impinges upon successive frames of the motion picture film 7 is shown at A–B–C. A light divider 3 is installed between the objectives 1, 2 to direct some incident light into a path B–D–E defined by a view finder 4. An adjustable diaphragm 6 is installed between the light divider 3 and the base objective 1; this diaphragm is adjusted by a built-in exposure meter including a light meter 5.

Figure 2:
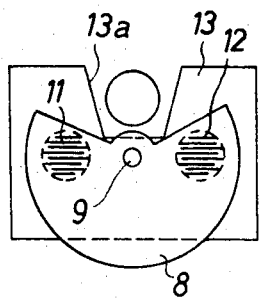
FIG. 2 is a schematic front elevational view of the shutter means in a first position.

A rotary shutter 8 is mounted between the base objective 1 and the motion picture film 7. The means for driving the shutter 8 includes a shaft 9 shown in FIGS. 2 to 4. The axis of this shaft is parallel to the optical axis. The front surface 8a of the shutter 8, i.e., that surface which faces the base objective 1, is arranged to remit, i.e., to diffuse and reflect incident light, preferably in such a way that it reflects a substantial portion, for example, between 60 and 80 percent, of incident light. However, the light beams reflected by the front surface 8a of the shutter 8 are not reflected in a single predetermined direction. For example, this front surface 8a can be coated with a layer of white lacquer; if the shutter 8 consists of metallic material, its front surface 8a can be finished to the polish. At least a portion of such front surface 8a is provided with a flat plate-like liner 10 of transparent material, preferably a liner of lightweight synthetic plastic material whose transparency matches that of colorless glass.

The housing of the camera includes a plate-like support 13 which is located in front of the shutter 8 and carries at least one but preferably two photoelectric receivers 11, 12. The receivers are resistors and are separated from the liner 10 by a narrow gap which is just wide enough to prevent rubbing contact between such parts when the shutter 8 rotates. The support 13 has a cutout or window 13a (FIG. 2) which permits incoming scene light to pass from the base objective 1 to the unexposed frame of the film 7 in a predetermined range of angular positions of the shutter 8.

The light meter 5 of the exposure meter comprises a moving coil assembly with two oppositely directed windings 5a, 5b. The receivers 11, 12 are connected in parallel to each other but in series with the winding 5b and with an energy source 14. A branch of the exposure meter circuit is parallel to the winding 5b and to receivers 11, 12 and contains the winding 5a and a variable resistor 15 which is adjustable to take into consideration certain other factors which influence the exposure, for example, the shutter speed, the sensitivity of film 7 and/or others. A damper resistor 16 is connected between the branches which contain the windings 5a, 5b.

Figure 3:
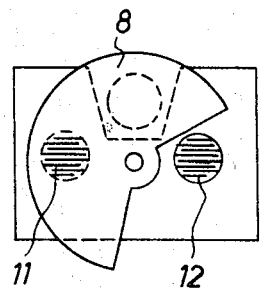
FIG. 3 illustrates the shutter means in a second position.
Figure 4:
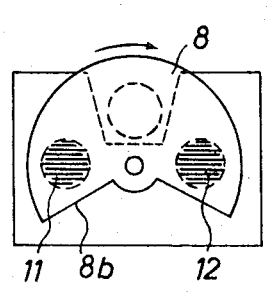
FIG. 4 shows the shutter means in a third position.

The operation is as follows:

When the shutter 8 is at a standstill, it assumes the starting position shown in FIG. 3. The liner 10 then overlaps the receiver 11 but not the receiver 12, i.e., only the receiver 11 is exposed to scene light. The strength of current which flows through the winding 5b is then a function of the resistance of receiver 11. When the shutter 8 begins to rotate, the liner 10 moves to the angular position shown in FIG. 4 so that the shutter then reflects light onto the receiver 11 as well as onto the receiver 12. Consequently, a stronger current flows through the winding 5b but only for a short interval of time because the shutter 8 begins to turn and moves beyond the position of FIG. 4 so that its radial edge 8b moves beyond the receiver 11, e.g., only the receiver 12 continues to receive scene light. Thus, the strength of the current which flows through the windings 5b decreases because the resistance of the receiver 11 increases when it fails to receive light from the front surface 8a of the shutter. Inertia of the light meter 5, of the diaphragm 6 and of the receivers 11, 12 insures that, despite intermittent variations in strength of the current which flows through the winding 5b, the setting of the diaphragm 6 is an accurate function of scene brightness and such setting is practically identical with that when the shutter 8 is at a standstill.

The setting of the variable resistor 15 in dependency on one or more exposure influencing factors will determine the initial setting of the diaphragm 6—independently of the intensity of scene light.

When the liner 10 extends across the path A-B-C, light issuing therefrom is diffused and is caused to reach the receiver 11 and/or 12. This insures an integral measurement across the entire field of view. Another advantage of the improved camera is that the receivers 11, 12 can be mounted in immediate proximity to the plane of the liner 10 so that they are separated from the liner by an extremely narrow gap and that the assembly including the parts 8, 10, 11, 12 occupies very little room. Also, the liner 10 adds very little to the weight of the camera, particularly if it consists of lightweight synthetic plastic material.

Still another important advantage of the camera is that, when the shutter 8 is idle in the starting position shown in FIG. 3, only one of the receivers 11, 13 is exposed to scene light. Thus, only a portion of light which travels from the base objective 1 toward the film 7 is directed against the receiver 11. This insures that, when the shutter 8 is set in rotary motion, the amount of scene light reaching the receivers 11, 12 during a full revolution of the shutter is practically the same as when the shutter is in starting position. Consequently, the adjustment of diaphragm 6 does not change at all unless the intensity of scene light changes. In other words, the amount of scene light reaching the receiver 11 when the shutter 8 is held in the starting position of FIG. 3 is substantially the same as the average amount of scene light reaching the resistor 11 and/or 12 during a full revolution of the shutter, first to the position of FIG. 4, thereupon to the position of FIG. 2 (exposure) and back to the position of FIG. 3. During such interval, the receiver 11 or 12 receives scene light while the other receiver does not receive any light, both receivers receive scene light, or no receiver receives light, depending on the momentary angular position of the shutter during a full revolution.

What is claimed as new and desired to be protected by Letters Patent is set forth in the appended claims:

1. In a cinematographic apparatus, particularly in a motion picture camera, a combination comprising objective means arranged to admit scene light along a predetermined path; shutter means located behind said objective means and being rotatable about a predetermined axis, said shutter means having a light-reflecting and diffusing front surface which respectively extends across and is moved away from said path in a first and a second range of angular positions of said shutter means; a substantially flat plate-like transparent liner covering at least a portion of said front surface to effect uniform reflection of light by such portion of said surface; and exposure meter means including photosensitive receiver means mounted adjacent to said liner and located outside of said path in such position as to receive light reflected by said surface in said first range of positions of said shutter means.

2. A combination as defined in claim 1, wherein said predetermined axis is parallel to the optical axis of said objective means.

3. A combination as defined in claim 1, wherein said surface is a light reflecting and diffusing surface.

4. A combination as defined in claim 3, wherein said surface is arranged to reflect at least 50 percent of incident light.

5. A combination as defined in claim 4, wherein said surface is arranged to reflect between 60 and 80 percent of incident light.

6. A combination as defined in claim 1, wherein said liner consists of synthetic plastic material.

7. A combination as defined in claim 1, wherein said photosensitive receiver means comprises a plurality of photoelectric resistors.

8. In a cinematographic apparatus, particularly in a motion picture camera, a combination comprising objective means arranged to admit scene light along a predetermined path; shutter means located behind said objective means and being rotatable about a predetermined axis, said shutter means having a front surface which respectively extends across and is moved away from said path in a first and a second range of angular positions of said shutter means; a transparent liner covering at least a portion of said front surface; and exposure meter means including photosensitive receiver means fixedly mounted adjacent to said liner and located outside of said path in such position as to receive light reflected by said surface in said first range of angular positions of said shutter means, said photosensitive receiver means comprising a plurality of photoelectric resistors including a pair of resistors and said shutter means being rotatable from a starting position in which said liner overlaps one of said pair of resistors.

9. A combination as defined in claim 8, wherein the resistors of said pair of resistors are disposed mirror symmetrically with reference to the axis of said shutter means.

10. A combination as defined in claim 8, wherein the resistors of said pair are connected in parallel.

References Cited

UNITED STATES PATENTS

| Re. 26,326 | 12/1967 | Van Der Fenst et al. | 352—141 |
| 2,996,952 | 8/1961 | Orlando | 95—10(C)X |
| 3,057,251 | 10/1962 | Mahn | 352—141X |
| 3,198,102 | 8/1965 | Mitchell | 352—141X |

FOREIGN PATENTS

| 1,280,609 | 11/1961 | France | 352—141 |

SAMUEL S. MATTHEWS, Primary Examiner

J. F. PETERS, Jr., Assistant Examiner

U.S. Cl. X.R.

95—10; 352—208